July 30, 1946. E. O. MORTON 2,404,978
FLUID SPEED INDICATOR
Filed Feb. 10, 1944
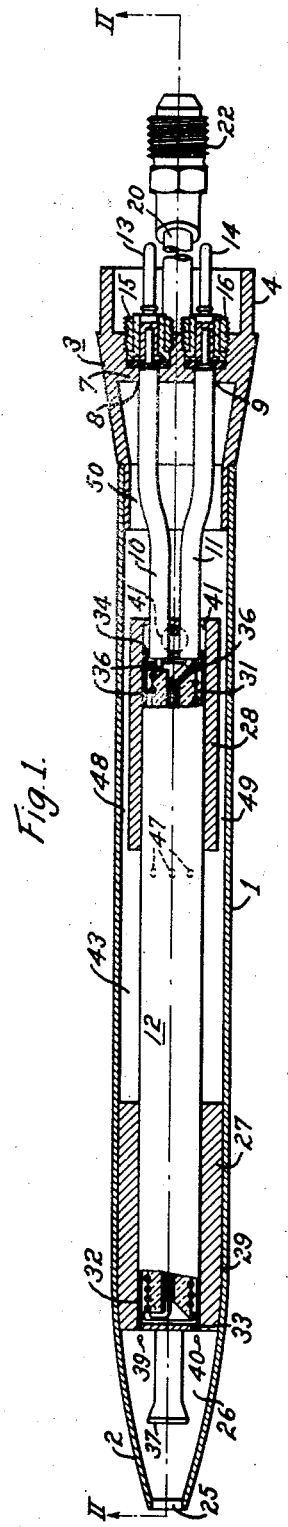
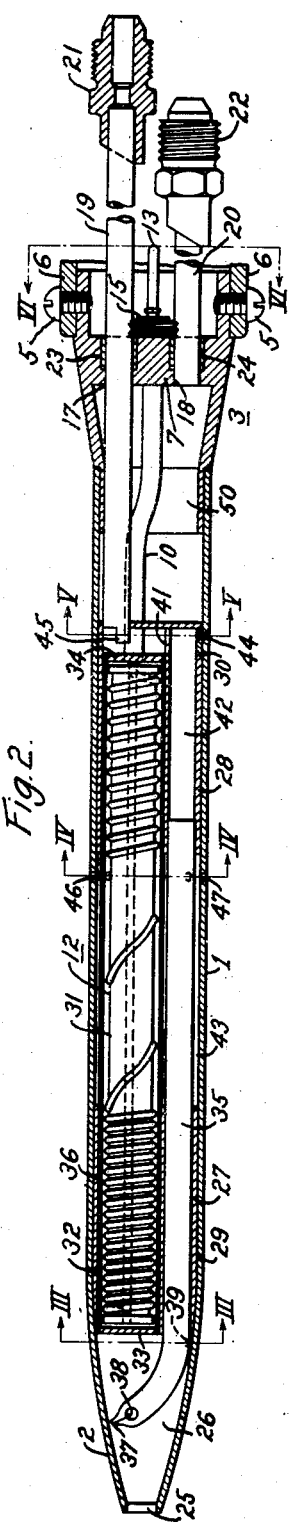
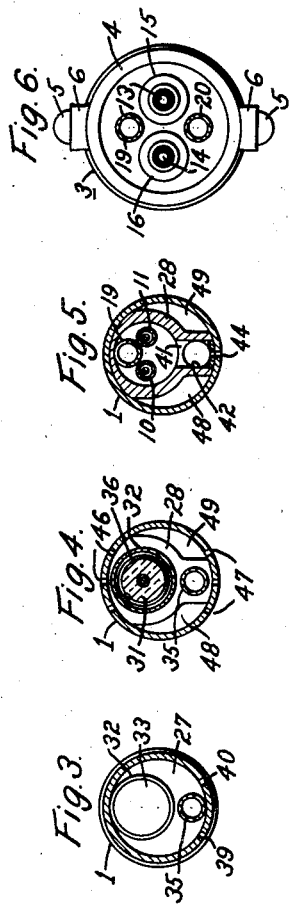
INVENTOR
*Eldred O. Morton.*
BY
*Paul C. Friedemann*
ATTORNEY Patented July 30, 1946

2,404,978

UNITED STATES PATENT OFFICE 2,404,978

FLUID SPEED INDICATOR

Eldred O. Morton, Mansfield, Ohio, assignor to Westinghouse Electric Corporation, East Pittsburgh, Pa., a corporation of Pennsylvania Application February 10, 1944, Serial No. 521,815

13 Claims. (Cl. 73—212)

My invention relates to devices for indicating the speed of a craft with reference to the medium through which it moves and more particularly to Pitot-static tubes, static tubes, and Pitot tubes.

My invention has particular utility for indicating the air speed of an aircraft by means of the measurement of the static air pressure, the dynamic air pressure, and the measurement of the relative dynamic and static pressures. My invention is, however, not limited to this particular application but is applicable to any application where static and dynamic fluid pressures are to be measured.

As is well known, tubes of this type are mounted on the outer portion of an aircraft wing, outboard strut or other location of an aircraft where the tube openings will be exposed to air flow in a region substantially undisturbed by the craft itself. By means of suitable pipes the tube openings are connected to an instrument on the instrument panel. The dynamic pressure is usually communicated to the interior of a hermetically sealed chamber having a movable diaphragm in one wall thereof for operating an indicator, and the static pressure is communicated to the outside of the chamber to exert a pressure on the diaphragm in opposition to the dynamic pressure effect. The differential pressure effect is thus indicated by the instrument thus indicating, or recording, as may be desired, the speed of the fluid relative to the Pitot-static tube. With other instruments the two pressures are communicated to two Bourdon tubes coupled mechanically at their movable ends in opposition, or communicated to two Sylphon bellows constructed like the Sylphon bellows of aneroid barometers, which Sylphon bellows are also mechanically coupled in opposition at their movable portions to thus produce indications proportional to the pressure differences in the two pressure responsive members. To make the instrument particularly useful to the pilot, the calibration is usually in miles per hour.

Since the Pitot-static tube must necessarily be located in the undisturbed region of the air, it is exposed to all climatic conditions and thus is particularly subject to the temperature of the surrounding air and the moisture content thereof. The introduction of moisture into the Pitot-static tube at the low temperatures usually encountered by aircraft at certain seasons and at high altitudes causes the moisture to freeze in the tube and thus impair, and more usually completely nullify, the operation of the air-speed indicating instruments.

One object of my invention is the prevention of the collection of any obstructing moisture whether in the form of ice or in the form of liquid in the chambers, conduits and openings in elements of Pitot-static tubes, static tubes, and Pitot tubes.

Another object of my invention is the provision of means for heating a Pitot-static tube by means that may be readily manufactured and readily assembled and by means of which the heat is properly distributed so that moisture in the form of ice or otherwise that may collect in the tube is readily and continuously discharged from the tube.

A still further object of my invention is the provision of an improved tube construction for air-speed indicators.

An important object of my invention is to simplify the construction and assembly and reduce the cost of the heater unit for an electrically heated air-speed tube.

It is also a broad object of my invention to provide an electrically heated Pitot-static tube of simple structure and having elements that may be easily and cheaply assembled and that may have improved operating characteristics.

Other objects and advantages will become more apparent from a study of the following specification and the accompanying drawing, in which:

Figure 1 is a longitudinal sectional view of the housing portion of a Pitot-static tube with certain parts broken away to illustrate some details;

Fig. 2 is a longitudinal sectional view substantially normal to the section plane of Fig. 1; and Figs. 3, 4, 5 and 6 are transverse sectional views on section lines III—III, IV—IV, V—V, and VI—VI, respectively, of Fig. 2.

So far as the outer contour of my improved Pitot-static tube is concerned, it is conventional in shape, that is, it has an outer cylindrical tube or casing 1 provided with a tapered forward end 2. The casing is preferably made of sheet or extruded brass, copper, or some other metal or alloy having good heat conducting properties and being resistant to corrosion. Since this sheet material is easily formed, the tapered end 2 may be formed by spinning.

At the right-hand end, or rear end, the tube 1 fits a machined portion of the brass or copper casting 3 and is secured to the casting by soldering or brazing or in some other suitable manner. The casting has a machined cylindrical projecting portion 4 threaded, as shown in Fig. 2, for receiving the bolts 5 (usually four) providing the rigid interconnection between the casting 3 and the cylindrical bracket 6 which is rigidly mounted on some suitable portion of the aircraft. The point of connection of the Pitot-static tube is so selected that it is rigidly supported to point in the direction the aircraft is pointing and at a region of air flow substantially undisturbed by the craft itself.

The casting, or end member 3, has a transverse wall 7 provided with a pair of apertures 8 and 9, as shown in Fig. 1, for receiving the conductors 10 and 11 leading to the heater unit 12 described more in detail hereinafter.

The conductors 10 and 11 are suitably connected to the connector studs 13 and 14 within porcelain ferrules shown, and the parts are held in firm relation to the wall 7 by nuts 15 and 16 for driving the porcelain ferrules against the relatively soft mica washers disposed at the left of the porcelain ferrules, all as shown.

The wall 7 is also provided with two further apertures 17 and 18 for receiving, through seals 23 and 24, the outlet tubes 19 and 20 for the dynamic and static pressures, respectively. These tubes are connected, by means of pipe connections 21 and 22, to another pair of tubes (not shown) leading to the air-speed indicating instrument (not shown).

At the nose or left-hand end of casing 1, I provide an opening 25 for receiving the dynamic air pressure and communicating that pressure to the region, or chamber, 26.

Two plug members, or heat distributing blocks, 27 and 28 are mounted within the casing 1. The blocks, when the assembly is complete, are rigidly held in place by soldering or brazing, preferably brazing, at regions 29 and 30. The plug members are preferably composed of copper, or some other corrosion resistant metal having good heat conducting properties.

The electrical heating unit includes a tube 31 of relatively rigid insulating material upon which the electric heating conductor or wire 36 is wound. One end of this wire 36 is inserted from the front of the tube through the relatively small axial opening in tube 31 and, where projecting from the tube 31 at the right end, is electrically connected to conductor 11. The portion of the wire 36 not inserted into the tube 31 is wound backwardly from the front end of the tube 31 with many relatively closely spaced turns. The closely spaced turns encompass the tube 31 for a length, measured from the front end of the tube, corresponding substantially to the length of block 27.

Near the middle of the tube 31, the number of turns is reduced and the spacing of the turns is increased up to a point spaced from the right-hand end of tube corresponding to the length of block 28. For the remaining length of tube 31, the winding is such that the spacing of the turns is again decreased, that is, the number of turns per unit length is increased. The number of turns per unit length for this region can, however, be considerably less than the number of turns per unit length at the front end of the tube. The ratio of the number of turns per unit length at the respective ends of the tube 31 may be in the order of 2:1. At the right end of tube 31, the wire 36 is electrically connected to the conductor 10.

The tube 31 with the electric heating wire 36 is inserted into sleeve 32. This sleeve is made of material having good heat conducting properties. This sleeve 32 has closure disks 33 and 34.

The sleeve 32 is disposed into a longitudinal opening, or well, in plug 27 so that the front closure 33 is substantially flush with the front end of plug 27 and the plug 28, also having a longitudinal opening, is disposed over the rear end of the sleeve 32 so that the closure 34 falls somewhat short of the right-hand, or the bottom, of the well in the plug 28.

The disk 33, together with the plug 27, forms a hermetic seal between chamber 26 and the portion to the right of the region of brazing 29. The only passage of fluid pressure from chamber 26 toward the right is thus through tube 35 to be described hereinafter. The closure 34 is also hermetically sealed to the plug 28.

From the foregoing, it is thus apparent that for the entire length of blocks 27 and 28 the wire is wound with many turns, but the number of turns for the region of block 28 may actually be only half that of the turns in the region of block 27. The reason for this distribution of turns is that the heat dissipation is greater at the region of block 27 than at the region of block 28. The number of turns must, therefore, be greater than at the region of block 28. By suitably proportioning the relation of the number of turns, a heat distribution is obtained that is in accordance with the requirements of actual usage and yet the heat is not wastefully dissipated.

The arrangement of the heater as a single cartridge with suitable heat concentration at the front and rear simplifies the construction and the assembly extremely and reduces the cost of the unit to a fraction of that of a heater built up of a plurality of small cartridges. Further, the sleeve 32, with the heating wire in position, can for convenience of assembly, be slipped into the blocks and secured to the blocks in proper spaced relation as a unit and then this unit inserted into the casing 1 from the rear.

The plug 27 has a substantially circular sectional shape whereas the plug 28 has a sectional shape as best shown in Fig. 4. Both plugs 27 and 28 are provided with longitudinal openings at the bottom, or lower portions, for receiving the tube 35. The tube 35 within chamber 26 is curved upwardly and pinched together as shown at 37 and is then provided with elongated or round side openings 38 as shown.

The air entering the casing at opening 25 is under dynamic pressure but may also be subject to some turbulence. The turbulence, since the openings 38 are at the side of the tube 35, can not influence the dynamic pressure within the tube 35. The pressure within the tube 35 is thus a true indication of the dynamic pressure of the air.

In order that no moisture may collect or ice be formed in chamber, I provide two or more apertures 39 and 40 in the casing adjacent the tube 35 and just to the left of the plug 27. When the heater is electrically energized, any moisture that may enter the chamber 26 is maintained in a fluid state by the heat conducted to the plug and to the casing. By the flow of air just outside of the casing and by natural drainage, the moisture is thus drawn out of chamber 26. The air in the chamber 26 thus remains relatively warm and substantially quiescent regardless of the weather conditions just outside. Perfect quiescence is, of course, not obtained because theoretically there is some slight air flow inwardly at opening 25 and outwardly at openings 39 and 40. The curved shape of tube 35 within the chamber 26 and the arrangement of the apertures 38 make for a substantially perfect quiescent state of the air within tube 35 and the transmission of the dynamic air pressure to the instrument is at no time impaired.

The plug 28 has a vertical channel 41 that is in communication with the longitudinal opening 42 so that the dynamic air pressure from tube 35 is transmitted to the lefthand end of tube 19.

The tube 35 is brazed into plug 27, and, for a short distance at the left of plug 28, into plug 28 in such manner that there is no leakage of any fluid from chamber 26 to chamber 43, nor from chamber 43 to channel 42.

To facilitate the manufacture of plug 28 and the assembly of my Pitot-static tube, I cut the vertical channel 41 all the way through at the bottom at 30. When the heating unit and the plugs and tube 35, assembled as one construction, are inserted to correct position in casing 1 and while being held in correct position, I first braze or solder the front plug 27 to the casing from the opening 25. The relatively small hole 44, when in registry with the vertical channel 41, indicates when the parts, or elements, within the casing are in correct position. After the front plug is brazed in position, which is a relatively easy matter since opening 25 is not too small, I allow sufficient brazing material to flow in at opening 44 so that it wets the rear end of plug 28 and leaves a closure, as shown at 30, for the bottom of vertical channel 41. All the parts are thus brought into fixed relation.

The foregoing method of assembly is the simplest, cheapest and most expeditious, so far as known to me, ever utilized in the manufacture of Pitot-static, static and Pitot tubes, or similar equipment.

Since the brazing material, or solder, will also close the small hole 44, I again open this hole by drilling through the closing plug at 30 to thus provide a small opening from channel 41 to the outside. This small opening provides an additional safeguard that no obstructing moisture gets into tube 19. Further, the left-hand end of tube 19 extending into plug 28, is provided with the arcuate protruding baffle 45. Should the air, in spite of the front heating turns and plug 27 and the apertures 39 and 40, still contain some moisture then the right-hand heating turns heating the heat-conducting plug 28 will assure that the last remnants of moisture are expelled at the small opening 44. The dynamic pressure communication to the air-speed indicating instrument thus can not become clogged.

In order to transmit the static air pressure to the tube 20, I provide the casing 1 with a plurality of apertures 46 at the top and a similar group of apertures 47 at the bottom. These apertures are disposed just to the left of plug 28 and are thus between the heated plugs 27 and 28. Any moisture that may get into the chamber 43 when the heater is electrically energized is thus heated, the apertures 46 and 47 are kept free of ice and the air flow outside of the tube and natural drainage remove the moisture from chamber 43.

Since plug 28 is shaped as shown in Figs. 4 and 5 forming the side channels 48 and 49, the static air pressure in chamber 43 is thus transmitted to chamber 50. Since tube 20 opens into chamber 50, the static air pressure is transmitted from chamber 43 through channels 48 and 49, chamber 50 and tube 20 to the air-speed indicating instrument.

Although I have described my invention with reference to but one embodiment, it is understood that the disclosure is only illustrative and not exhaustive and that numerous changes in details and combination and arrangements of parts may be made without departing from the spirit and the scope of my invention as hereinafter claimed.

I claim as my invention:

1. A Pitot-static tube comprising, in combination, an elongated casing pointed at the front end having an opening at the front for receiving the dynamic pressure of the fluid flowing with reference to the Pitot-static tube, a front plug and a rear plug within the casing and a rear closure for the casing, said plugs and closure dividing the casing into a front chamber, a middle chamber and a rear chamber, said front plug being provided with a longitudinal channel at the top and a second longitudinal channel at the bottom, said rear plug being provided with a longitudinally disposed well at the top of a given depth, and being provided with a second longitudinally disposed well at the bottom of the plug, a single elongated electrical heating unit in the upper channel of the front plug and the upper well of the rear plug, a conduit passing through the bottom channel of the front plug and extending into the bottom well of the rear plug, said conduit fitting snugly and sealed into said plugs so that when said electrical heating unit is in place there be no communication between the first and second chambers and the second chamber and the bottom well of the rear plug, a vertical channel at the rear end of the rear plug providing a communication between the bottom well of the rear plug and the top well of the rear plug, a conduit extending through the top portion of the rear plug into the vertical channel, a baffle at the lower forward end of said second mentioned conduit, said second mentioned conduit providing a communication to an indicating instrument, said casing being provided with drain means near the front end of the front plug to drain out any moisture that might collect in the front chamber, said casing and rear plug being provided with drain means at the rear end of the rear plug which drain means are in communication with the vertical channel in the rear plug, said casing also being provided with a plurality of openings in the top and bottom thereof near the front end of the rear plug to receive the static pressure of the fluid flowing with reference to the Pitot-static tube, said rear plug having channels for providing a substantially free communication between the middle chamber and the rear chamber, a conduit disposed in the closure for providing a communication of the static pressure from the rear chamber to an indicating instrument.

2. In a Pitot-static tube, in combination, an elongated casing having an opening in its forward end for receiving air under dynamic pressure, and having an opening in its side for receiving air under static pressure, a single electrical heating unit, a pair of plug members embracing the ends of said heating unit disposed in spaced relation within the casing and fitting snugly and in sealing relation against the inner wall of said casing, the front plug member having a longitudinal conduit disposed below the front end of the heating unit and the second plug having a longitudinal channel at the bottom thereof, a dynamic pressure carrying conduit fitting into the top portion of the rear plug, said rear plug being provided with channel means for providing an intercommunication between the channel in the bottom of the rear plug and said conduit, interconnecting conduit means providing a communication duct from the region in front of the front plug through the longitudinal conduit of the front plug and the channel of the second plug to the dynamic pressure carrying conduit, said rear plug having additional channels extending entirely therethrough longitudinally to provide a free communication between the region to the front of the rear plug and the rear of the rear plug, a static pressure conduit communicating with a region to the rear of the rear plug for connection to an indicating instrument.

3. In a Pitot-static tube, in combination, an elongated casing having an opening in its forward end for receiving air under dynamic pressure, and having an opening in its side for receiving air under static pressure, a single electrical heating unit designed to produce a greater heating effect at the front end than at the rear end, a pair of plug members embracing the ends of said heating unit disposed within the casing and fitting snugly against the inner wall of said casing, the front plug member having a longitudinal conduit disposed below the front end of the heating unit and the second plug having a longitudinal channel at the bottom thereof, a dynamic pressure carrying conduit fitting into the top portion of the rear plug, said rear plug being provided with channel means for providing an intercommunication between the channel in the bottom of the rear plug and said pressure carrying conduit, interconnecting conduit means providing a communication duct from the region in front of the front plug through the longitudinal conduit of the front plug and the channel of the second plug to the dynamic pressure carrying conduit, said rear plug having additional channels extending entirely therethrough longitudinally to provide a free communication between the region to the front of the rear plug and the rear of the rear plug, a static pressure conduit communicating with a region to the rear of the rear plug for connection to an indicating instrument.

4. A Pitot-static tube comprising, in combination, an elongated casing pointed at the front end having an opening at the front for receiving the dynamic pressure of the fluid flowing with reference to the Pitot-static tube, a front plug and a rear plug within the casing and a rear closure for the casing, said plugs and closure dividing the casing into a front chamber, a middle chamber and a rear chamber, said front plug being provided with a longitudinal channel at the top and a second longitudinal channel at the bottom, said rear plug being provided with a longitudinally disposed well at the top of a given depth, and being provided with a second longitudinally disposed well at the bottom of the plug, a single elongated electrical heating unit in the upper channel of the front plug and the upper well of the rear plug, said single elongated electrical heating unit having more heating sections in the channel of the front plug than in the well of the rear plug, said front plug providing a closure for the casing so that no fluid pressure can be communicated from the front chamber to the middle chamber, a dynamic pressure transmitting conduit passing through the bottom channel of the front plug and extending into the forward end of the bottom well of the rear plug, said dynamic pressure transmitting conduit fitting snugly into said plugs so that there be no communication between the first and second chambers and the second chamber and the bottom well of the rear plug, a vertical channel at the rear end of the rear plug providing a communication between the bottom well of the rear plug and the top portion of the rear end of the rear plug, a second dynamic pressure transmitting conduit extending through the top portion of the rear plug into the vertical channel for transmitting the dynamic pressure of the fluid flowing past the casing to an indicating instrument.

5. A Pitot-static tube comprising, in combination, an elongated casing pointed at the front end having an opening at the front for receiving the dynamic pressure of the fluid flowing with reference to the Pitot-static tube, a front plug and a rear plug within the casing and a rear closure for the casing, said plugs and closure dividing the casing into a front chamber, a middle chamber and a rear chamber, said front plug being provided with a longitudinal channel at the top and a second longitudinal channel at the bottom, said rear plug being provided with a longitudinally disposed well at the top of a given depth, and being provided with a second longitudinally disposed well at the bottom of the plug, a single elongated electrical heating unit in the upper channel of the front plug and the upper well of the rear plug, said single elongated electrical heating unit having more heating sections in the channel of the front plug than in the well of the rear plug, said front plug providing a closure in the casing so that no fluid pressure can be communicated from the front chamber to the middle chamber, a dynamic pressure transmitting conduit passing through the bottom channel of the front plug and extending into the forward end of the bottom well of the rear plug, said conduit having an upwardly curved forward part in the front chamber so that its end terminates inside near the top of the casing, said dynamic pressure transmitting conduit fitting snugly into said plugs so that there be no communication between the first and second chambers and the second chamber and the bottom well of the rear plug, a vertical channel at the rear end of the rear plug providing a communication between the bottom well of the rear plug and the top portion of the rear end of the rear plug, a second dynamic pressure transmitting conduit extending through the top portion of the rear plug into the vertical channel for transmitting to an indicating instrument the dynamic pressure of the fluid flowing past the casing.

6. A Pitot-static tube comprising, in combination, an elongated casing pointed at the front end having an opening at the front for receiving the dynamic pressure of the fluid flowing with reference to the Pitot-static tube, a front plug and a rear plug within the casing and a rear closure for the casing, said plugs and closure dividing the casing into a front chamber, a middle chamber and a rear chamber, said front plug being provided with a longitudinal channel at the top and a second longitudinal channel at the bottom, said rear plug being provided with a longitudinally disposed well at the top of a given depth, and being provided with a second longitudinally disposed well at the bottom of the plug, a single elongated electrical heating unit in the upper channel of the front plug and the upper well of the rear plug, said single elongated electrical heating unit having more heating sections in the channel of the front plug than in the well of the rear plug, said front plug providing a closure in the casing so that no fluid pressure can be communicated from the front chamber to the middle chamber, a dynamic pressure transmitting conduit passing through the bottom channel of the front plug and extending into the forward end of the bottom well of the rear plug, said conduit being curved upwardly in the front chamber and the extreme upper end of the curved part being closed but provided with side openings near the closed end, said dynamic pressure transmitting conduit fitting snugly into said plugs so that there be no communication between the first and second chambers and the second chamber and the bottom well of the rear plug, a vertical channel at the rear end of the rear plug providing a communication between the bottom well of the rear plug and the top portion of the rear end of the rear plug, a second dynamic pressure transmitting conduit extending through the top portion of the rear plug into the vertical channel for transmitting to an indicating instrument the dynamic pressure of the fluid flowing past the casing.

7. A Pitot-static tube comprising, in combination, an elongated casing pointed at the front end having an opening at the front for receiving the dynamic pressure of the fluid flowing with reference to the Pitot-static tube, a front plug and a rear plug within the casing and a rear closure for the casing, said plugs and closure dividing the casing into a front chamber, a middle chamber and a rear chamber, said front plug being provided with a longitudinal channel at the top and a second longitudinal channel at the bottom, said rear plug being provided with a longitudinally disposed well at the top of a given depth, and being provided with a second longitudinally disposed well at the bottom of the plug, a single elongated electrical heating unit in the upper channel of the front plug and the upper well of the rear plug, said single elongated electrical heating unit having more heating sections in the channel of the front plug than in the well of the rear plug, said front plug providing a closure in the casing so that no fluid pressure can be communicated from the front chamber to the middle chamber, a dynamic pressure transmitting conduit passing through the bottom channel of the front plug and extending into the forward end of the bottom well of the rear plug, said dynamic pressure transmitting conduit fitting snugly into said plugs so that there be no communication between the first and second chambers and the second chamber and the bottom well of the rear plug, a vertical channel at the rear end of the rear plug providing a communication between the bottom well of the rear plug and the top portion of the rear end of the rear plug, a second dynamic pressure transmitting conduit extending through the top portion of the rear plug into the vertical channel for transmitting to an indicating instrument the dynamic pressure of the fluid flowing past the casing, a baffle at the lower forward end of the second dynamic pressure transmitting conduit, said casing being provided with moisture drain means at the bottom of the casing substantially directly in front of the front plug, and said casing and rear plug being provided with moisture drain means at the bottom and at the region of the vertical channel so that a communication is established between the vertical channel and the outside.

8. A Pitot-static tube comprising, in combination, an elongated casing pointed at the front end having an opening at the front for receiving the dynamic pressure of the fluid flowing with reference to the Pitot-static tube, a front plug and a rear plug within the casing and a rear closure for the casing, said plugs and closure dividing the casing into a front chamber, a middle chamber and a rear chamber, said front plug being provided with a longitudinal channel at the top and a second longitudinal channel at the bottom, said rear plug being provided with a longitudinally disposed well at the top of a given depth, and being provided with a second longitudinally disposed well at the bottom of the plug, a single elongated electrical heating unit in the upper channel of the front plug and the upper well of the rear plug, said single elongated electrical heating unit having more heating sections in the channel of the front plug than in the well of the rear plug, said front plug providing a closure in the casing so that no fluid pressure can be communicated from the front chamber to the middle chamber, a dynamic pressure transmitting conduit passing through the bottom channel of the front plug and extending into the forward end of the bottom well of the rear plug, said conduit having an upwardly curved forward part in the first chamber so that its end terminates inside near the top of the casing, said dynamic pressure transmitting conduit fitting snugly into said plugs so that there be no communication between the first and second chambers and the second chamber and the bottom well of the rear plug, a vertical channel at the rear end of the rear plug providing a communication between the bottom well of the rear plug and the top portion of the rear end of the rear plug, a second dynamic pressure transmitting conduit extending through the top portion of the rear plug into the vertical channel for transmitting to an indicating instrument the dynamic pressure of the fluid flowing past the casing, a baffle at the lower forward end of the second dynamic pressure transmitting conduit, said casing being provided with moisture drain means at the bottom of the casing substantially directly in front of the front plug, and said casing and rear plug being provided with moisture drain means at the bottom and at the region of the vertical channel so that a communication is established between the vertical channel and the outside.

9. A Pitot-static tube comprising, in combination, an elongated casing pointed at the front end having an opening at the front for receiving the dynamic pressure of the fluid flowing with reference to the Pitot-static tube, a front plug and a rear plug within the casing and a rear closure for the casing, said plugs and closure dividing the casing into a front chamber, a middle chamber and a rear chamber, said front plug being provided with a longitudinal channel at the top and a second longitudinal channel at the bottom, said rear plug being provided with a longitudinally disposed well at the top of a given depth, and being provided with a second longitudinally disposed well at the bottom of the plug, a single elongated electrical heating unit in the upper channel of the front plug and the upper well of the rear plug, said single elongated electrical heating unit having more heating sections in the channel of the front plug than in the well of the rear plug, said front plug providing a closure in the casing so that no fluid pressure can be communicated from the front chamber to the middle chamber, a dynamic pressure transmitting conduit passing through the bottom channel of the front plug and extending into the forward end of the bottom well of the rear plug, said dynamic pressure transmitting conduit fitting snugly into said plugs so that there be no communication between the first and second chambers and the second chamber and the bottom well of the rear plug, a vertical channel at the rear end of the rear plug providing a communication between the bottom well of the rear plug and the top portion of the rear end of the rear plug, a second dynamic pressure transmitting conduit extending through the top portion of the rear plug into the vertical channel for transmitting to an indicating instrument the dynamic pressure of the fluid flowing past the casing, said casing also being provided with means both at the bottom and the top of the casing substantially directly in front of the rear plug to receive the static pressure of the fluid outside of the casing, said rear plug having channels for providing a substantially free communication between the middle chamber and the rear chamber, and a static pressure transmitting conduit extending through the rear closure for providing a communication of the static pressure to an indicating instrument.

10. A Pitot-static tube comprising, in combination, an elongated casing pointed at the front end having an opening at the front for receiving the dynamic pressure of the fluid flowing with reference to the Pitot-static tube, a front plug and a rear plug within the casing and a rear closure for the casing, said plugs and closure dividing the casing into a front chamber, a middle chamber and a rear chamber, said front plug being provided with a longitudinal channel at the top and a second longitudinal channel at the bottom, said rear plug being provided with a longitudinally disposed well at the top of a given depth, and being provided with a second longitudinally disposed well at the bottom of the plug, a single elongated electrical heating unit in the upper channel of the front plug and the upper well of the rear plug, said single elongated electrical heating unit having more heating sections in the channel of the front plug than in the well of the rear plug, said front plug providing a closure in the casing so that no fluid pressure can be communicated from the front chamber to the middle chamber, a dynamic pressure transmitting conduit passing through the bottom channel of the front plug and extending into the forward end of the bottom well of the rear plug, said conduit having an upwardly curved forward part in the first chamber so that its end terminates inside near the top of the casing, said dynamic pressure transmitting conduit fitting snugly into said plugs so that there be no communication between the first and second chambers and the second chamber and the bottom well of the rear plug, a vertical channel at the rear end of the rear plug providing a communication between the bottom well of the rear plug and the top portion of the rear end of the rear plug, a second dynamic pressure transmitting conduit extending through the top portion of the rear plug into the vertical channel for transmitting to an indicating instrument the dynamic pressure of the fluid flowing past the casing, said casing also being provided with means both at the bottom and the top of the casing substantially directly in front of the rear plug to receive the static pressure of the fluid outside of the casing, said rear plug having channels for providing a substantially free communication between the middle chamber and the rear chamber, and a static pressure transmitting conduit extending through the rear closure for providing a communication of the static pressure to an indicating instrument.

11. A Pitot-static tube comprising, in combination, an elongated casing pointed at the front end having an opening at the front for receiving the dynamic pressure of the fluid flowing with reference to the Pitot-static tube, a front plug and a rear plug within the casing and a rear closure for the casing, said plugs and closure dividing the casing into a front chamber, a middle chamber and a rear chamber, said front plug being provided with a longitudinal channel at the top and a second longitudinal channel at the bottom, said rear plug being provided with a longitudinally disposed well at the top of a given depth, and being provided with a second longitudinally disposed well at the bottom of the plug, a single elongated electrical heating unit in the upper channel of the front plug and the upper well of the rear plug, said single elongated electrical heating unit having more heating sections in the channel of the front plug than in the well of the rear plug, said front plug providing a closure in the casing so that no fluid pressure can be communicated from the front chamber to the middle chamber, a dynamic pressure transmitting conduit passing through the bottom channel of the front plug and extending into the forward end of the bottom well of the rear plug, said dynamic pressure transmitting conduit fitting snugly into said plugs so that there be no communication between the first and second chambers and the second chamber and the bottom well of the rear plug, a vertical channel at the rear end of the rear plug providing a communication between the bottom well of the rear plug and the top portion of the rear end of the rear plug, a second dynamic pressure transmitting conduit extending through the top portion of the rear plug into the vertical channel for transmitting to an indicating instrument the dynamic pressure of the fluid flowing past the casing, a baffle at the lower forward end of the second dynamic pressure transmitting conduit, said casing being provided with moisture drain means at the bottom of the casing substantially directly in front of the front plug, and said casing and rear plug being provided with moisture drain means at the bottom and at the region of the vertical channel so that a communication is established between the vertical channel and the outside, said casing also being provided with means both at the bottom and the top of the casing substantially directly in front of the rear plug to receive the static pressure of the fluid outside of the casing, said rear plug having channels for providing a substantially free communication between the middle chamber and the rear chamber, and a static pressure transmitting conduit extending through the rear closure for providing a communication of the static pressure to an indicating instrument.

12. A Pitot-static tube comprising, in combination, an elongated casing pointed at the front end having an opening at the front for receiving the dynamic pressure of the fluid flowing with reference to the Pitot-static tube, a front plug and a rear plug within the casing and a rear closure for the casing, said plugs and closure dividing the casing into a front chamber, a middle chamber and a rear chamber, said front plug being provided with a longitudinal channel at the top and a second longitudinal channel at the bottom, said rear plug being provided with a longitudinally disposed well at the top of a given depth, and being provided with a second longitudinally disposed well at the bottom of the plug, a single elongated electrical heating unit in the upper channel of the front plug and the upper well of the rear plug, said single elongated electrical heating unit having more heating sections in the channel of the front plug than in the well of the rear plug, said front plug providing a closure in the casing so that no fluid pressure can be communicated from the front chamber to the middle chamber, a dynamic pressure transmitting conduit passing through the bottom channel of the front plug and extending into the forward end of the bottom well of the rear plug, said conduit having an upwardly curved forward part in the first chamber so that its end terminates inside near the top of the casing, said dynamic pressure transmitting conduit fitting snugly into said plugs so that there be no communication between the first and second chambers and the second chamber and the bottom well of the rear plug, a vertical channel at the rear end of the rear plug providing a communication between the bottom well of the rear plug and the top portion of the rear end of the rear plug, a second dynamic pressure transmitting conduit extending through the top portion of the rear plug into the vertical channel for transmitting to an indicating instrument the dynamic pressure of the fluid flowing past the casing, a baffle at the lower forward end of the second dynamic pressure transmitting conduit, said casing being provided with moisture drain means at the bottom of the casing substantially directly in front of the front plug, and said casing and rear plug being provided with moisture drain means at the bottom and at the region of the vertical channel so that a communication is established between the vertical channel and the outside, said casing also being provided with means both at the bottom and at the top of the casing substantially directly in front of the rear plug to receive the static pressure of the fluid outside of the casing, said rear plug having channels for providing a substantially free communication between the middle chamber and the rear chamber, and a static pressure transmitting conduit extending through the rear closure for providing a communication of the static pressure to an indicating instrument.

13. A Pitot-static tube comprising, in combination, an elongated casing pointed at the front end having an opening at the front for receiving the dynamic pressure of the fluid flowing with reference to the Pitot-static tube, a front plug and a rear plug within the casing and a rear closure for the casing, said plugs and closure dividing the casing into a front chamber, a middle chamber and a rear chamber, said front plug being provided with a longitudinal channel at the top and a second longitudinal channel at the bottom, said rear plug being provided with a longitudinally disposed well at the top of a given depth, and being provided with a second longitudinally disposed well at the bottom of the plug, a single elongated electrical heating unit in the upper channel of the front plug and the upper well of the rear plug, said single elongated electrical heating unit having more heating sections in the channel of the front plug than in the well of the rear plug, said front plug providing a closure in the casing so that no fluid pressure can be communicated from the front chamber to the middle chamber, a dynamic pressure transmitting conduit passing through the bottom channel of the front plug and carried upwardly in the front chamber and extending into the forward end of the bottom well of the rear plug, the extreme upper end of the curved part extending into the front chamber being closed but provided with side openings near the closed end, said dynamic pressure transmitting conduit fitting snugly into said plugs so that there be no communication between the first and second chambers and the second chamber and the bottom well of the rear plug, a vertical channel at the rear end of the rear plug providing a communication between the bottom well of the rear plug and the top portion of the rear end of the rear plug, a second dynamic pressure transmitting conduit extending through the top portion of the rear plug into the vertical channel for transmitting to an indicating instrument the dynamic pressure of the fluid flowing past the casing, a baffle at the lower forward end of the second dynamic pressure transmitting conduit, said casing being provided with moisture drain means at the bottom of the casing substantially directly in front of the front plug, and said casing and rear plug being provided with moisture drain means at the bottom and at the region of the vertical channel so that a communication is established between the vertical channel and the outside, said casing also being provided with means both at the bottom and the top of the casing substantially directly in front of the rear plug to receive the static pressure of the fluid outside of the casing, said rear plug having channels for providing a substantially free communication between the middle chamber and the rear chamber, and a static pressure transmitting conduit extending through the rear closure for providing a communication of the static pressure to an indicating instrument.

ELDRED O. MORTON.